United States Patent Office 2,966,057
Patented Dec. 27, 1960

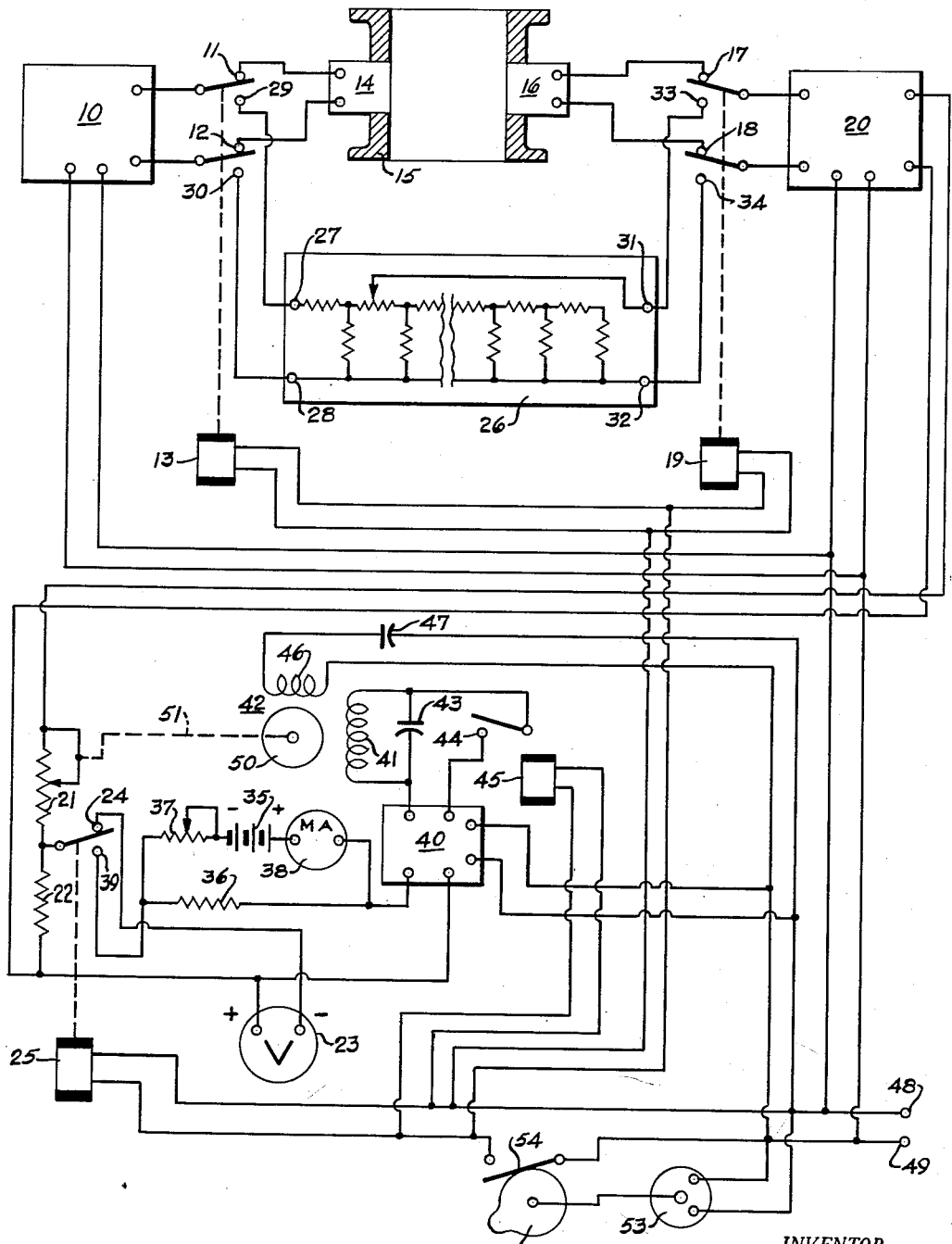

2,966,057

APPARATUS FOR MEASURING ATTENUATION OF ULTRASONIC ENERGY

Robert B. Heller, Silver Spring, Md., assignor to Curtiss-Wright Corporation, a corporation of Delaware Filed Apr. 30, 1956, Ser. No. 581,746

2 Claims. (Cl. 73—67.6)

This invention relates to ultrasonic apparatus and particularly to such apparatus for measuring the attenuation of ultrasonic energy transmitted through material, whereby the measured attenuation is an indication of a characteristic of the material.

Ultrasonic apparatus operating in the frequency range from twenty kilocycles to several megacycles has been used for this purpose, specifically, for indicating the density of material or for indicating the amount of solids in a liquid on the basis of difference in the attenuation suffered by ultrasonic energy in transmission through this material.

Such apparatus usually comprises a generator and a transducer for converting electric energy into mechanical energy, which is transmitted through the material under test. A second transducer is generally provided for receiving mechanical vibrations transmitted through the material and converting them into second electric oscillations, the amplitude of which is measured and is an indication of the attenuation suffered by the transmitted ultrasonic energy. Such arrangements are sensitive to the amplitude of oscillations produced by the generator and are also sensitive to the gain of the amplifier used to amplify the second electric oscillations and, therefore, make the arrangements sensitive to changes in power-line voltage, aging of electric tubes, and similar effects, giving rise to spurious indications.

It is an object, therefore, of the present invention to provide an improved ultrasonic measuring apparatus in which spurious indications are avoided by the use of means for standardizing the apparatus periodically.

In accordance with the present invention, there is provided apparatus for measuring the attenuation of ultrasonic energy transmitted through material, comprising a generator of first electric oscillations, and a first electromechanical transducer for imparting ultrasonic vibrations produced by the oscillations to material under test. A second electro-mechanical transducer is provided and is adapted to intercept ultrasonic vibrations transmitted through the material under test for converting intercepted vibrations into second electric oscillations. Signal translating means for utilizing the second oscillations are provided to produce an electric signal, indicative of the attenuation suffered by the vibrations in transmission between the generator and the signal translating means. Finally, attenuator means are provided for attenuating electric oscillations, and switching means for selectively connecting the attenuator between the generator and the signal translating means.

For a better understanding of the invention, together with other and further objects thereof, reference is had to the following description taken in connection with the accompanying drawing and its scope will be pointed out in the appended claims.

The accompanying drawing schematically illustrates an arrangement embodying the present invention, wherein the effects of variations of the signal translating means are substantially reduced.

Referring now to the drawing, there is shown an arrangement for measuring the attenuation of material flowing in a pipe section, comprising a generator 10 of electric oscillations in the frequency range of, say, between 20 kilocycles and several megacycles, the choice of frequencies depending largely upon the nature of the material under test. Generator 10 might include a vacuum tube oscillator and associated power amplifier stage of conventional design. Preferably, the generator is designed so as to produce oscillations of substantially constant amplitude, for example by employment of degenerative feedback, as is well known in the art. The output of generator 10 is coupled by way of relay contacts 11 and 12 of relay 13 to a first electro-mechanical transducer 14. This transducer is attached to a pipe section 15 in any suitable manner for imparting ultrasonic vibrations to material (not shown) flowing through pipe section 15. The transducer 14 is provided with a piezoelectric element, which might be a quartz crystal, a barium titanate crystal, or might be a magnetostriction unit, all well known in the art. For receiving ultrasonic vibrations transmitted through material flowing in pipe section 15, there is provided a second electromechanical transducer 16, attached to pipe section 15 and preferably of the same or similar design as transducer 14. Transducer 16 is coupled through contacts 17 and 18 of a relay 19 to a signal translating means 20, comprising an alternating current amplifier for amplifying second electric oscillations corresponding to the ultrasonic vibrations intercepted by transducer 16, and rectifying means for converting the amplified electric oscillations into a unidirectional electric signal developed across the series combination of a rheostat 21 and a fixed resistance element 22.

For indicating the magnitude of the unidirectional electric signal corresponding to the magnitude of intercepted ultrasonic vibrations, there is provided a voltmeter 23 connected by way of a contact 24 of a relay 25 to the junction point of rheostat 21 and resistance element 22.

For periodically standardizing the arrangement just described, there is provided an attenuator 26 shown by way of example as a single ladder resistance attenuator, whose input terminals 27 and 28 are connected to relay contacts 29 and 30 of relay 13. The output terminals 31 and 32 of attenuator 26 are connected to contacts 33 and 34 of relay 19. This arrangement provides means for selectively connecting generator 10 through attenuator 26 to the signal translating means 20.

For the purpose of periodically and automatically standardizing the arrangement, there is provided a standardizing circuit including a battery 35, reference resistance element 36, a rheostat 37, and a milliammeter 38; all connected in circuit as shown, for producing an adjustable reference voltage across resistance element 36. For connecting the standardizing circuit to the output circuit of signal translating means 20, there is provided a contact 39 associated with relay 25, adapted to connect resistance elements 36 and 22 in series relation to the input terminals of a chopper type amplifier 40. Such amplifiers are well known in the art and comprise a vibrating reed converter or chopper for converting unidirectional input signals into 60 cycle A.C. signals, which are amplified and applied to the control winding of a two-phase drive motor. Amplifier 40 may be of conventional design, commercially available and is, therefore, not described in detail. Connected in the output circuit amplifier 40 are one winding 41 of a two-phase motor generally indicated at 42, in parallel relation with a capacitor 43 and in series relation with a contact 44 of a relay 45. Motor 42 is provided with a second winding 46, connected through a capacitor 47 to the 60 cycle power line connected to terminals 48 and 49. For varying the electric signal produced across resistance element 22, rotor 50 of motor 42 is mechanically coupled to the slider of rheostat 21 by means of a mechanical coupling, indicated by a broken line 51. For periodically and automatically standardizing the arrangement described, and selectively connecting attenuator 26 between generator 10 and signal translating means 20, connecting the standardizing circuit to resistance element 22, and energizing motor winding 41 by energizing relays 13, 19, 25 and 45, there is provided a cam 52 driven by a clock motor 53 and adapted to close intermittently a contact 54, thereby closing the energizing circuit for the aforementioned relays.

In operation, electric oscillations from generator 10 are converted into ultrasonic vibrations by transducer 14, are transmitted through material in pipe section 15, and are intercepted by transducer 16. Transducer 16 converts the intercepted vibrations into electric oscillations, which are amplified and rectified by signal translating means 20 to produce a unidirectional electric signal across the series combination of rheostat 21 and resistance element 22. The magnitude of the electric signal appearing across element 22 is indicated by voltmeter 23 and is dependent upon the adjustment of the slider on rheostat 21. The indication on voltmeter 23 is indicative of the attenuation suffered by ultrasonic vibrations transmitted through material when flowing through pipe section 15. If, now, the gain of the amplifier section of signal translating means 20 varies, for any reason whatsoever, a different electric signal is produced across element 22 so that it is difficult reliably to correlate the indication on voltmeter 23 with a predetermined attenuation of ultrasonic vibrations transmitted through the material under test. This is a disadvantage of arrangements of this type, which are commonly referred to in the art as deflectional arrangements.

By measurements under controlled conditions, the attenuation suffered by ultrasonic vibrations through a given sample of standard material, can be readily determined and the attenuator 26 adjusted to exactly duplicate this loss as follows. Pipe section 15 is filled with the sample of standard material and the magnitudes of the electric oscillations applied to the input transducer 14 as input, and developed by transducer 16 as output, respectively measured by suitable means not shown. The output of generator 10 is then applied to the input of attenuator 26, and its output, in turn, measured by suitable means not shown. Thus, the attenuator having been calibrated simulates the transmission path including transducers 14 and 15, and the sample of standard material in the pipe section 15. At the proper setting, there being no spurious changes in the output of the generator 10 or the signal translating means 20, the indication on voltmeter 23 will be the same as observed when transmitting through the attenuator 26 as when transmitting through the sample of standard material in pipe section 15. Consequently, the arrangement is then calibrated for the given material tested, in terms of attenuator setting and voltmeter indication.

Periodically relays 13, 19, 25, and 45 are energized by closing contact 54 by cam 52 driven by motor 53. Closure of contact 54 may take place every 15 minutes, 30 minutes, 1 hour, or more or less frequently as found necessary, for an interval of say, 10 seconds. Such a 10-second interval is a standardizing interval, during which generator 10 is connected through contacts 29 and 30 to terminals 27 and 28 of attenuator 26, and disconnected from transducer 14. Output terminals 31 and 32 of attenuator 26 are connected through contacts 33 and 34 to the input terminals of signal translating means 20, which is disconnected from transducer 16. Resistance element 22 is now connected through contact 39 to resistance element 36, and this combination is connected to input terminals of amplifier 40. The polarities of the voltage across elements 22 and 36 are so chosen that when the voltages are equal, no signal appears across the input terminals of amplifier 40.

The reference voltage developed across element 36 is adjusted by means of rheostat 37 and with the aid of milliammeter 38. Depending upon whether the electric signal across element 22 is greater or smaller than the reference voltage across element 36, the input signal to amplifier 40, will be positive or negative and the motor control voltage across winding 41 will be of one phase or of the opposite phase, and rotor 50 will turn in one direction or in the opposite direction. The slider of rheostat 21 is then moved in one direction or in the opposite direction until the electric signal across element 22 is equal to the reference voltage across element 36. When this is the case, the input signal to amplifier 40 is zero and rotor 50 of motor 42 remains at rest.

The reference voltage across element 36 is adjusted to be equal to an electric signal across element 22 which corresponds to a predetermined setting of attenuator 26, and thereby, corresponds to a predetermined attenuation by a predetermined material under test.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for measuring the attenuation of penetrating rays in passing through a test object which comprises a source of penetrating rays, including a generator for generating a series of electrical impulses and beam producing means responsive to electrical impulses for generating a beam of penetrating rays; a standard attenuator for producing an attenuation of the electrical pulses corresponding to the attenuation of the penetrating rays in passing through an object having known characteristics, translator means including ray responsive means spaced from said beam producing means for receiving the penetrating rays which pass through the test material and producing a series of electrical impulses proportional thereto and signal responsive means for producing a signal proportional to said electrical impulses; switching means for alternatively connecting said beam producing means to said generator and said ray responsive means to said signal responsive means in a first switching position and the attenuator between said generator and said signal responsive means in a second switching position whereby said translator means produces a first signal proportional to the attenuation of the penetrating rays in passing through the test object in said first switching position and a second signal proportional to the attenuation of the electrical pulses in passing through the object having known characteristiocs in said second switching position; indicator means for alternatively indicating the magnitude of said first and second signals, said indicator means including an adjustable impedance; calibrating means including a reference calibrating signal for receiving and comparing said second signal with said reference calibration signal; and means responsive to the difference between said second signal and said reference calibration signal for adjusting said adjustable impedance to compensate said indicator means for changes in said second signal resulting from changes introduced by said generator and said signal responsive means whereby said indicator means in indicating the magnitude of said first signal senses only the changes in attenuation of the penetrating rays due to changes in the test object.

2. Apparatus for measuring the attenuation of penetrating rays in passing through a test object which comprises a source of penetrating rays, including a generator for generating a series of electrical impulses and a first transducer responsive to electrical impulses for generating a beam of penetrating rays; a standard attenuator for producing an attenuation of the electrical pulses corresponding to the attenuation of the penetrating rays in passing through an object having known characteristics; translator means including a second transducer spaced from said first transducer for receiving the penetrating rays which pass through the test material and producing a series of electrical impulses proportional thereto and amplifier means for producing a voltage proportional to said electrical impulses; switching means for alternatively connecting said first transducer to said generator and said second transducer to said amplifier means in a first switching position and the attenuator between said generator and said amplifier means in a second switching position whereby said amplifier means produces a first voltage proportional to the attenuation of the penetrating rays in passing through the test object in said first switching position and a second voltage proportional to the attenuation of the electrical pulses in passing through the object having known characteristics in said second switching position; indicator means for alternatively indicating the magnitude of said first and second voltages, said indicator means including an adjustable impedance; calibrating means including a reference calibrating voltage for receiving and comparing said second voltage with said reference calibration voltage; and means responsive to the difference between said second voltage and said reference calibration voltage for adjusting said adjustable impedance to compensate said indicator means for changes in said second voltage resulting from changes introduced by said generator and said amplifier means whereby said indicator means in indicating the magnitude of said first voltage senses only the changes in attenuation of the penetrating rays due to changes in the test object.

References Cited in the file of this patent

UNITED STATES PATENTS

| | | |
|---|---|---|
| 2,612,772 | McConnell | Oct. 7, 1952 |
| 2,755,662 | Swengel | July 24, 1956 |